United States Patent [19]

Jones, Jr. et al.

[11] Patent Number: 4,621,354

[45] Date of Patent: Nov. 4, 1986

[54] DTMF RECEIVER SENSE AND CONTROL MAINTENANCE ARRANGEMENT

[75] Inventors: Leo V. Jones, Jr., Glendale; A. Lee Walsh, Phoenix, both of Ariz.

[73] Assignee: GTE Communication Systems Corporation, Phoenix, Ariz.

[21] Appl. No.: 685,197

[22] Filed: Dec. 21, 1984

[51] Int. Cl.⁴ .......................... H04J 1/16; H04J 3/14; H04J 3/12
[52] U.S. Cl. .................................. 370/13; 370/110.1; 370/110.3; 370/68.1; 379/18; 379/283
[58] Field of Search .................... 370/13, 110.3, 110.1, 370/17, 58, 62; 179/84 VF, 84 SS, 84 T, 6.3 R, 6.3 CC, 175.2 C, 175.2 D

[56] References Cited

U.S. PATENT DOCUMENTS

| | | | |
|---|---|---|---|
| 4,203,008 | 5/1980 | Cohn-Sfetcu et al. | 370/110.3 |
| 4,219,699 | 8/1980 | Nilssen et al. | 179/84 VF |
| 4,439,636 | 3/1984 | Newkirk et al. | 179/6.3 CC |
| 4,506,359 | 3/1985 | Henquin et al. | 370/110.1 |
| 4,518,824 | 5/1985 | Mondardini | 179/6.3 CC |

Primary Examiner—Douglas W. Olms
Assistant Examiner—Wellington Chin
Attorney, Agent, or Firm—Frank J. Bogacz; Peter Xiarhos

[57] ABSTRACT

The DTMF receiver sense and control arrangement collects and stores multiple customer originated data for determination of customer identification, validity and billing purposes. This arrangement is part of a telecommunications switching office and monitors up to 24 DTMF receivers (channels) to determine whether each channel contains valid data. This data is stored in temporary storage for subsequent transmission to a processor of the switching office. Each of the DTMF receivers asynchronously presents data for collection by this arrangement. This arrangement provides the proper timing required to operate up to 24 receivers to obtain their data, while it is stable at the receiver. Once a receiver transmits data, this arrangement then synchronizes its operation to that receiver so that, sequential monitoring of each of the 24 channels is guaranteed and no loss of valid data will result. In addition, each DTMF receiver may be enabled selectively for special monitoring. In order to insure the effective operation of the receiver arrangement, this invention provides for transmitting selected maintenance data. The maintenance data transmitted is compared with the data sent by the processor to determine whether the receiver arrangement is operating properly.

7 Claims, 2 Drawing Figures

4,621,354

DTMF RECEIVER SENSE AND CONTROL MAINTENANCE ARRANGEMENT

BACKGROUND OF THE INVENTION

The present invention pertains to a data acquisition arrangement for a telecommunications switching system and more particularly to an arrangement for insuring the operation of circuitry for collecting and transmitting customer data for identification, validation and billing of special features such as calling card services.

With the popularization of placing telephone calls via credit cards, existing telecommunication switching systems require modifications to provide this function to customers. Customer identification is required for billing purposes. Further, a validity code is required to insure that the credit card is being properly used.

This data must be collected in an on-line fashion. That is, before the switching system may complete the call, the customer must transmit the required information to the switching system via his station equipment. The customer is supplied with a request signal indicating that the switching system requires this information. The customer then responds with a series of numbers via the DTMF keypad with the required identification, billing and validity data. The switching system must then collect this information; transmitted to its central processing unit; and, analyzes the information for proper handling of the telephone call. If a valid call has been initiated by the customer, the system will respond by connecting his call.

Accordingly, systems which were previously designed and did not originally incorporate this feature, must be supplemented to provide this capability. The present invention is a maintenance arrangement for a DTMF receiver arrangement of a telecommunications system which provides for checking data acquisition and transmission for special features such as calling card service.

SUMMARY OF THE INVENTION

In a telecommunications switching system which has a network clock, a DTMF receiver maintenance arrangement is connected to a number of DTMF receivers of a receiver arrangement. These DTMF receivers interface customers to the switching system for transmitting data to the switching system. The DTMF receiver maintenance arrangement is operable to determine whether said DTMF receiver arrangement is operating properly.

The DTMF receiver maintenance arrangement includes control points which are connected to a processor and the control points operated to store and transmit DTMF receiver data to and from the processor. Sense points are connected to the processor and operate to store data for transmission to the processor.

A sequencing circuit is connected to the network clock. The sequencing circuit operates in response to the network clock to produce a number of regularly defined time slots for sampling DTMF receivers during a complete DTMF receiver sampling cycle.

The DTMF receiver maintenance arrangement also includes last look circuitry. The last look circuitry is connected to the DTMF receivers, to the sequencing circuit and to the network clock. The last look circuit cyclically operates during each time slot in response to the sequencing circuit to produce and to store an indication of whether a particular DTMF receiver has been previously sampled for valid data during the current DTMF receiver sampling cycle.

A generating circuit is connected to the control points, to the last look circuit and to the sequencing circuit. The generating circuit operates in response to an indication of said last look circuit that the particular DTMF receiver has previously been sampled during the current sampling cycle. As a result, the generating circuit operates to inhibit production of a write signal which allows valid data to be stored. The generating circuit also operates in response to an indication that of the last look circuit, that the particular DTMF receiver of this time slot has been previously sampled during the current DTMF receiver sampling cycle. In response to this indication, the generating circuit produces a write signal which enables valid data to be stored. The last look circuitry also stores the new sampling indication.

A storage device is connected to the DTMF receivers for storing valid receiver data. In addition, the storage device is also connected to the sequencing circuit, to the generating circuit and to the sense points. The storage device operates in response to the write signal of the generating circuit to store data from a particular DTMF receiver during the corresponding time slot. The storage device also operates to transmit the stored data of each DTMF receiver to the sense point for retransmission to the processor of the switching system.

A maintenance arrangement is connected to the control points, to the sequencing circuit, to the last look circuitry, to the generating circuit and to the storage device. The maintenance arrangement operates in response to a processor request to transmit predefined maintenance data to the storage device during a particular time slot. This maintenance data is retransmitted to the processor. The processor compares the predefined maintenance data with the retransmitted maintenance data to detect proper operation of the DTMF receiver arrangement.

A BRIEF DESCRIPTION OF THE DRAWINGS

DESCRIPTION OF THE PREFERRED EMBODIMENT

Figure 1:
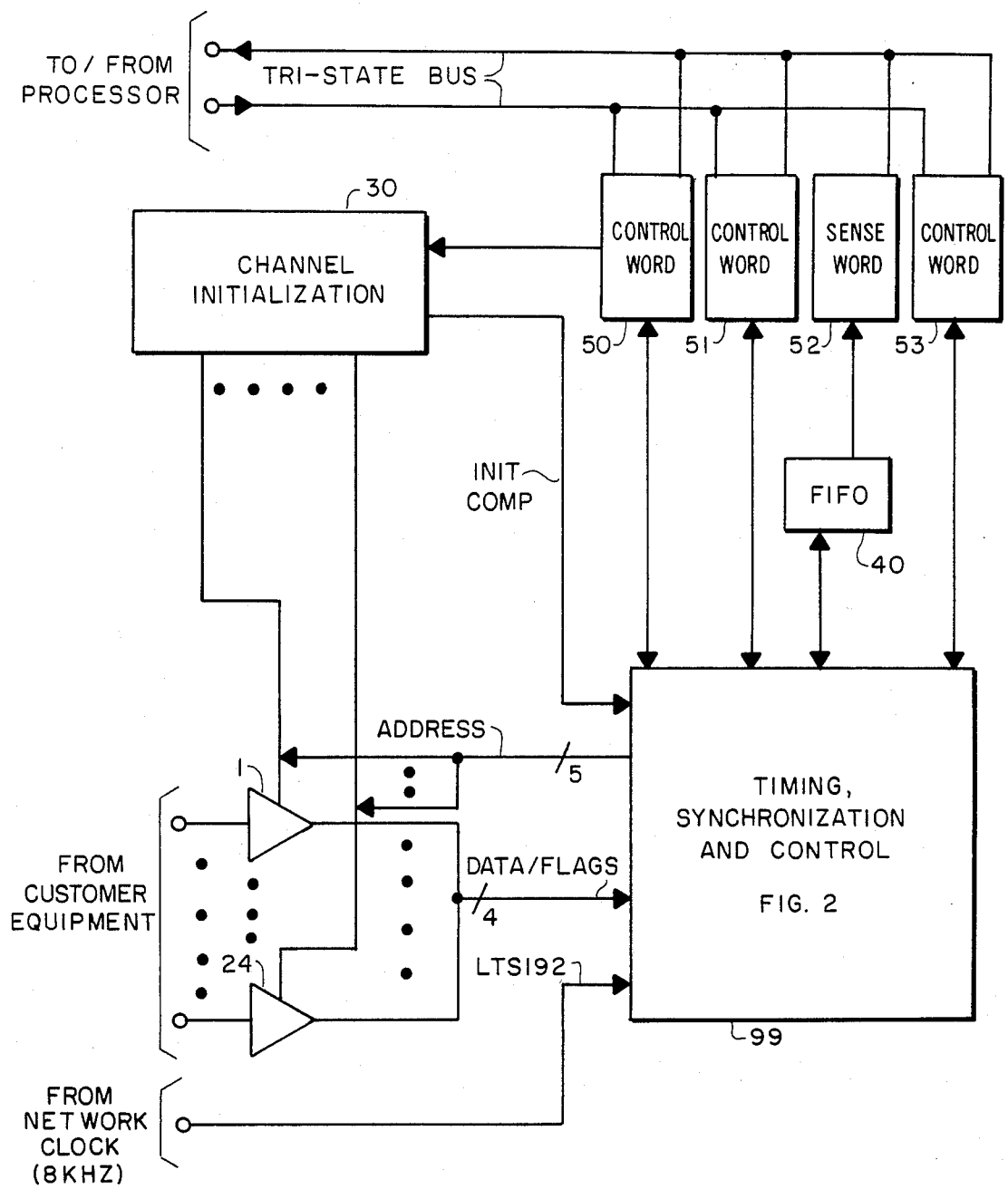
FIG. 1 is a block diagram of a DTMF receiver sense and control arrangement for a telecommunications switching system.
Figure 2:
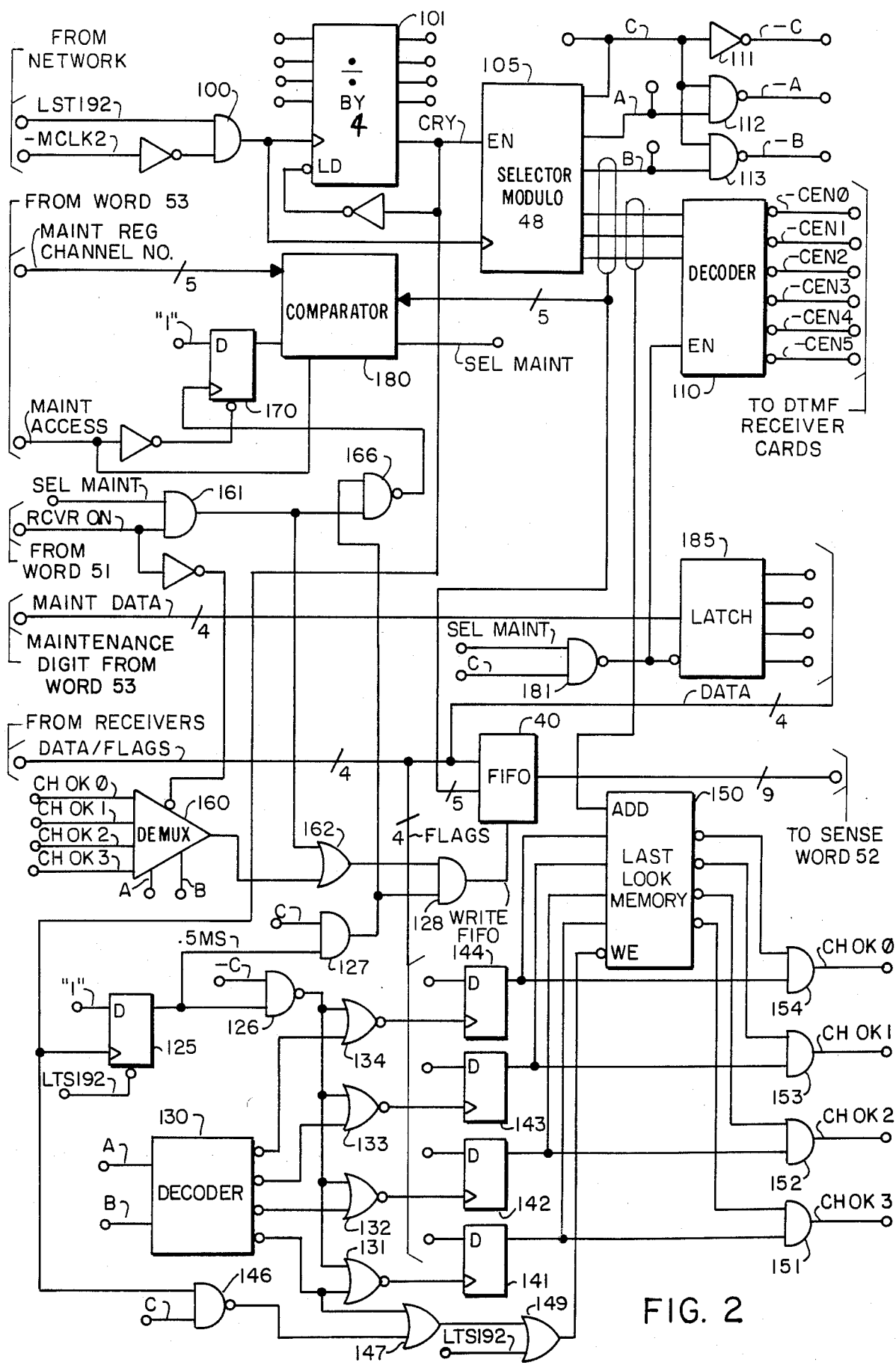
FIG. 2 is a schematic diagram of the control logic for the DTMF receiver sense and control arrangement of the present invention.

Referring to FIG. 1, a block diagram of the DTMF receiver sense and control arrangement is shown. The DTMF receiver sense and control (DRSC) arrangement is connected to the switching system's processor via a tri-state bus. The processor interfaces to the DRSC by operating three control point words (50, 51, 53) and one sense point word (52). Word 52 is a sense word. Words 50, 51 and 53 are control words. Sense words may only be read from by the processor, whereas control words may be written to or read from by the processor. The DRSC may read and write both sense and control words. Each of the sense and control words and the corresponding tri-state bus is 32 bits wide however, this design is not limited to a 32 bit implementation.

DTMF receivers 1 through 24 are connected between and the timing, synchronization and control logic 99. This DRSC arrangement may monitor up to 24 such DTMF receivers. The timing, synchronization and control logic 99 is also connected to a network clock (not shown) which operates at a frequency 8 khz. Logic 99 is connected to the network clock via the LTS 192 lead. DTMF receivers 1 through 24 are connected to the logic 99 via the data/flags bus. The data/flags bus is 4 bits wide. Logic 99 selectively examines each of the 24 DTMF receivers. In order to connect the logic 99 to one of the DTMF receivers. The DTMF receivers are accessed by a 5 bit address bus.

In addition, channel initialization hardware is connected between each of the 24 DTMF receivers and control word 50. The channel initialization hardware 30 is also connected to the logic 99 via INITCOMP lead.

Control words 50, 51 and 53 are connected to logic sense word 52 is connected to FIFO 40 which is turn connected to logic 99. The fact that the DTMF receivers 1 through 24 are packaged four per printed wiring card is important to further understanding of the present invention. The processor transmits an indication via the tri-state bus to control word 50. This indication determines which group of 4 DTMF receivers on a particular printed wiring card is to be initialized. These indications are stored and control word 50 and transmitted to the channel initialization hardware 30 in response to this transfer. Channel initialization hardware 30 addresses the particular printed wiring card of DTMF receivers indicated by control word 50 and initializes these receivers for a transmission of customer data to the logic 99. When the initialization of the DTMF receivers is complete, a signal is transmitted from the channel initialization hardware 30 via the INITCOMP lead to the logic 99.

Next, the processor indicates to the logic 99 which of the 24 DTMF receivers have been initialized and are ready for use by the call processing function. To accomplish this, the processor sets bits and control word 51 which correspond to those DTMF receivers which have been initialized. The purpose of the DRSC circuitry is to provide a means for collecting customer data, so that, this data may be processed by an off-line data processing system for validating and billing customers for special service such as, credit card calls. The data is taken by the logic 99 at a particular rate. The DTMF channel will hold customer data valid for approximately 45 milliseconds. The logic 99 access each DTMF channel once every 24 milliseconds to guarantee that the customer data is accessed while the data is stable. Each one millisecond access interval of a receiver is broken up into two intervals each of 0.5 milliseconds. During the first interval, logic 99 examines a flag to determine whether the particular receiver is transmitting a valid digit. During the second interval, logic 99 removes the data digit from the receiver and stores it in FIFO 40. Each data word stored in FIFO 40 will also contain a corresponding 5 bit address of the particular DTMF receiver from which the data originated.

When the processor requires the customer data FIFO 40 has unlocked one data word containing the channel address and the DTMF data into sense word 52. The processor will read this word from sense word 52 and store it in the processors memory.

In addition, the processor may indicate to logic 99 that it is to receive a particular data word via control word 53 for maintenance purposes. The processor will transmit this data word via the tri-state bus to control word 53. Logic 99 will remove this data word from the control word 53 and insert it into the data being sent back to the processor through FIFO 40 at the appropriate time. The processor will read this data via the sense word 52 and determine whether the word read compares to the word the processor transmitted, thereby indicating a fault in the DRSC circuitry.

The DTMF receivers or channels are connected to FIFO 40 via the data/flags 4 bit bus. Control word 51 of FIG. 1 is connected to AND gate 161 via the RCVR ON lead. On each cycle of the DRSC clock, an indication is transmitted via this lead. This indication determines whether the particular receiver to be examined in this time slot is active. The processor sets bits in word 51 corresponding to each one of the 24 receivers which is active. Therefore, the DRSC will send data to the processor for only those receivers which are active.

The LTS192 signal, which is an 8 khz frequency, and the MCLK2 signal are transmitted from the network clock of the switching system to AND gate 100 via corresponding leads. AND gate 100 is connected to divide by four circuit 101. Divide by four circuit 101 is connected to selector 105, which is a modulo 48 circuit, providing for a set of output signals which indicate 48 equal time periods. In addition, divide by four circuit 101 is connected to D-type flip-flop 125 and to NAND gate 146.

Selector 105 is connected via a number of output leads to decoder 110. Decoder 110 provides a plurality of signals via the CEN 0 through CEN 5 leads. These leads are connected to the six DTMF receiver printed wiring cards. Each DTMF receiver printed wiring card contains four DTMF receiver circuits.

Selector 105 produces three other signals on the A, B and C leads. The A and B leads along with the three other signals, which produce the DTMF receiver printed wiring card enables, represent the identity of the particular DTMF channel for which the DRSC is currently processing data. These leads containing the channel number are connected to comparator 180 and to FIFO 40. When a digit of customer data is transmitted to the processor of the switching system, the channel number (DTMF receiver identity) which produced this digit is also simultaneously transmitted.

The data/flags bus is connected to the D input of flip-flops 141 through 144. Inverted copies of the A, B and C signals are produced by gates 112, 113 and 111 respectively. Gates 112 and 113 are connected to decoder 130. Since the A and B signals are the low to order bits of the channel number, their decode by decoder 130 produces an indication of which one of the four DTMF receivers on a particular printed wiring card is currently being interrogated for data.

Decoder 130 is connected to NOR gates 131 through 134. NOR gates 131 through 134 are connected to the clock input of D-type latches 141 through 144, respectively. NAND gate 126 is connected to D-type latch 125 and to gate 111. The output of NAND gate 126 is connected as an enabling signal to NOR gates 131 through 134. NAND gates 146 and decoder 130 are each connected to NOR gate 147. NOR gate 147 and the network clock via the LTS192 lead are connected to NOR gate 149. NOR gate 149 is connected to the write enable of the last look memory 150.

D-type flip-flop 125 and gate 111 are connected to NAND gate 127, which is also connected to AND gate 128. Demultiplexer 160 and gate 161 are connected to OR gate 162, which in turn is connected to AND gate 128. AND gate 128 is connected via the WRITE FIFO lead to FIFO 40. The signal on this lead enables FIFO 40 to receiver and store valid data digits from each of the receivers at the appropriate time intervals.

The outputs of selector 105, which are decoded for the DTMF receiver printed wiring cards, are connected to last look memory 150 as an address. The outputs of D-type latches 141 through 144 are connected as the data inputs to last look memory 150. These four inputs represent the four DTMF receivers on a particular printed wiring card. Only one of the four DTMF receivers on a particular printed wiring card will be responding during a particular DRSC clock interval. The outputs of last look memory 150 are connected to AND gates 151 through 154. In addition, the output of D-type flip-flops 141 through 144 are respectively connected to AND gates 151 through 154. The output of AND gates 151 through 154 are connected to demultiplexer 160. Demultiplexer 160 is also connected to gates 112 and 113. The RCVR ON lead from word 51 of FIG. 1 is connected as an enabling signal to demultiplexer 160.

The output of FIFO 40 is connected via a 9 bit bus to sense word 52 for transmission to the processor of the customer digits.

For a maintenance access of the DRSC circuitry, the processor sets an indication in control word 53 of FIG. 1. Control word 53 is connected via the MAINT ACCESS lead to D-type latch 170. NAND gate 166 is connected to the clock input of latch 170. The maintenance function of the processor inserts a particular digit word into the stream of digits transmitted from the DRSC to the processor. The processor then reads back to the appropriate receiver digit and determines whether the digit received corresponds to the digit transmitted. The processor transmits the maintenance digit to control word 53 of FIG. 1. Control word 53 is connected via a 4 bit bus to latch 185.

Flip-flop 170 is connected to comparator 180. Comparator 180 is also connected to word 53 of FIG. 1 via the MAINT REG CHANNEL # lead for receiving the maintenance channel identity number. Comparator 180 is connected to NAND gate 181. NAND gate 181 is also connected to gate 111. The output of NAND gate 181 is connected to the enable of decoder 110 and to the enable of latch 185. The output latch 185 is connected via the 4 bit input DATA bus to FIFO 40. In addition, comparator 180 is connected to the input of AND gate 161.

Two clock signals from the network clock (LTS192 and MCLK2) are combined by AND gate 100 and transmitted to divide by four circuit 101. Divide by four circuit 101 produces a signal on the CRY lead which is transmitted to selector 105. Selector 105 produces all the timing signals necessary for operation of the DRSC logic. The DRSC counts modulo 48 and produces a number of signals during each one of the 48 intervals. Three of the signals produced by selector 105 are the high order 3 bits of the channel number, which is the identity of the current DTMF receiver to be processed by the DRSC circuitry. These signals are transmitted to decoder 110. Decoder 110 produces card enables CEN 0 through CEN 5. The A and B signals of selector 105 are the two low order bits of the channel number. The opposite sense of the A and B signals is produced by NAND gates 112 and 113, respectively. Both senses of these signals are used throughout the circuit.

The signal produced on the C lead indicates which half cycle of 48 cycles of selector 105 is currently in progress. During the first half of each selector cycle, the C lead is at logic 0 and flags from a particular printed wiring card of receivers are gated to latches 141 through 144 for determination of whether a valid digit exists for the corresponding receivers. Although, during this selector cycle, one of the card enables CEN signals enables one particular printed wiring card containing four DTMF receivers, only one of the receivers has meaningful data. During the selector half cycle when the C signal is at logic 1, valid data appears on the data/flag bus from the particular receiver. This data is gated into FIFO 40.

A total of 48 selector cycles was chosen because data is available and stable at the receiver for 45 milliseconds. It takes approximately 1 millisecond to process each receiver therefore, 24 receivers may be processed in 24 milliseconds. The 24 millisecond count of selector 105 guarantees that each receiver will be serviced while it has valid and stable data. Also, each receiver may be examined a second time.

When the CRY signal is clocked, flip-flop 125 latches this signal and provides and enabling signal to NOR gates 131 through 134 via gate 126. The two low order bits of the channel address (A and B) are decoded by decoder 30 to select which one of the four receivers on a particular printed wiring card is currently operating in this clock cycle. Decoder 130 then operates the corresponding gate 131 through 134, which latches a flag in one of the flip-flops 141 through 144, corresponding to the particular one of four receivers which is enabled during this clock cycle. When a flag is set in last look memory 150, it indicates that on the previous examination of that receiver, a valid digit was collected from that receiver.

Since each receiver is examined twice within a 48 millisecond time period, the same digit may be seen twice. In order to circumvent this problem, the value of the flag stored in flip-flops 141 through 144 is anded with the value contained for that receiver in the last look memory 150, by AND gates 151 through 154, respectively. This produces the CHOK 0 through CHOK 3 signals. The CHOK 0–CHOK 3 signals are then input to demultiplexer 160. Demultiplexer 160 is enabled as a function of the RCVR ON signal, whenever a particular receiver is active. In addition, demultiplexer 160 decodes the two low order bits of the channel address A and B in order to select the appropriate one of four last look values. Demultiplexer 160 then produces a signal, which it transmits to gate 128 to produce the WRITE FIFO signal, which causes FIFO 40 to store the present value of the data/flags bus. The data on the data/flag bus will be stored, if the value of the last look for that particular receiver is 0, however, if the last look value for that particular receiver was 1, indicating that it had been sampled within the previous 24 millisecond interval, the WRITE FIFO signal will be inhibited and data will not be stored into FIFO 40. When this cycle has been repeated for the other three receivers on the printed wiring card currently being examined, the contents of latches 141 through 144 are stored in the last look memory 150 via the signal from gate 149, which occurs once every four clock cycles of selector 105, transmitted to the WE input of last book memory 150. The flags are written into last look memory 150 as a function of the high three order bits of the channel address produced by selector 105.

FIFO 40 continuously presents the first data which it received and transmits this data to sense word 52 of FIG. 1. When the processor initiates a read of sense word 52, the next oldest word contained in FIFO 40 is transmitted to sense word 52. In this way, the processor may cyclically retrieve a data digit for each of the 24 DTMF receivers.

For a maintenance access, the processor transmits to control word 53 a bit (MAINT ACCESS), which indicates that a maintenance access is requested, and the identity of the DTMF channel (channel number) in which to insert a predefined data digit. In addition, the processor transmits the maintenance digit to control word 53. Control word 53 writes the maintenance digit into latch 185 via the MAINT DATA bus, which is a 4 bit bus.

Latch 185 stores the maintenance digit, until such time as it is required for insertion into the digit stream transmitted to the processor via sense word 52. The data input to flip-flop 170 is permanently set at logic 1 and the MAINT ACCESS signal causes flip-flop 170 to produce a signal for operating comparator 180.

Comparator 180 compares the maintenance channel number transmitted by the processor with the current channel number produced by selector 105. For comparison of the two channel numbers, the SEL MAINT signal is produced by comparator 180, which indicates that the current channel cycle is the one for which the maintenance digit is to be transmitted. The SEL MAINT signal is transmitted to gate 161 which causes gate 166 to reset the maintenance request to comparator 180 for the next selector cycle. In addition, the SEL MAINT signal operates NAND gate 181 to disable decoder 110 from producing card enables CEN 0 through CEN 5, while simultaneously enabling latch 185. Latch 185, when enabled, transmits the 4 bit digit via the DATA lead to FIFO 40 during the particular selector cycle requested for maintenance by the processor. This data digit is then transmitted via sense word 52 to the processor, as if it was collected from the corresponding receiver. The processor then analyzes the digit to determine whether a fault in the DRSC logic exists and the nature of a fault for any bit failure in the pattern transmitted. As a result, the transmission operation of data for each DTMF receiver channel may be tested. The next selector cycle will occur as a typical access to a receiver.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system having a network clock, a DTMF receiver maintenance arrangement is connected to a plurality of DTMF receivers which interface customers to said switching system for transmitting data to said switching system, said DTMF receiver maintenance arrangement operable for determining proper operation of a DTMF receiver arrangement, said DTMF receiver maintenance arrangement comprising:
   a processor;
   control means connected to said processor, said control means being operated to store and to transmit data from said processor and to said processor;
   sense means connected to said processor, said sense means being operated to store data and to transmit said stored data to said processor;
   sequencing means connected to said network clock, said sequencing means being operated in response to said network clock to produce a plurality of regularly defined time slots during a DTMF receiver sampling cycle;
   last look means connected to said plurality of DTMF receivers, to said sequencing means and to said network clock, said last look means being cyclically operated during each said time slot in response to said sequencing means to produce and to store an indication of whether a particular DTMF receiver has been previously sampled for valid data during a current DTMF receiver sampling cycle;
   generating means connected to said control means, to said last look means and to said sequencing means, said generating means being operated in response to said indication of said last look means that said particular DTMF receiver has been previously sampled during said current DTMF receiver sampling cycle, to inhibit production of a write signal and said generating means being further operated in response to an indication of said last look means that said particular DTMF receiver is to be sampled during a corresponding time slot of said current DTMF receiver sampling cycle, to produce said write signal;
   storage means connected to said plurality of DTMF receivers, to said sequencing means, to said generating means and to sense means, said storage means being operated in response to said write signal to store said data from a particular DTMF receiver druing said corresponding time slot and said storage means being further operated to transmit said stored data of each DTMF receiver to said sense means for retransmission to said processor;
   maintenance means connected to said control means, to said sequencing means, to said last look means, to said generating means and to said storage means, said maintenance means being operated in response to a request from said processor to transmit maintenance data to said storage means during a particular specified time slot for said retransmission to said processor; and
   said processor being operated in response to said retransmitted data to compare said retransmitted data with said maintenance data for determining said proper operation of said DTMF receiver arrangement.

2. A DTMF receiver maintenance arrangement as claimed in claim 1, said control means including at least first, second and third control point word means, said third control point word means connected between said processor and said maintenance means, said third control point word means being operated to transmit a maintenance channel identity of a DTMF receiver, to transmit said maintenance data and to transmit said maintenance request.

3. A DTMF receiver maintenance arrangement as claimed in claim 2, said maintenance means including comparing means connected to said third control point word means, to said sequencing means and to said generating means, said comparing means being operated to detect whether said current time slot of said DTMF receiver cycle is equal to said maintenance channel identity and to produce a select maintenance output signal.

4. A DTMF receiver maintenance arrangement as claimed in claim 3, said maintenance means further including first gating means connected to said generating means and to said last look means and being operated in response to said select maintenance signal to produce a reset maintenance signal.

5. A DTMF receiver maintenance arrangement as claimed in claim 4, said maintenance means further including first latching means connected between said third control point word means, and first gating means and said comparing means, said first latching means being operated in response to said reset maintenance signal to inhibit said maintenance request until a next succeeding time slot.

6. A DTMF receiver maintenance arrangement as claimed in claim 5, said maintenance means further including second gating means connected to said sequencing means and to said comparing means, said second gating means being operated to produce an enable maintenance digit output signal.

7. A DTMF receiver maintenance arrangement as claimed in claim 6, said maintenance means further including second latching means connected to said third control point word means, to said second gating means and to said storage means, said second latching means being operated in response to said third control point to store said maintenance data; said second latching means being further operated in response to said enable maintenance digit output signal to transmit said stored maintenance data to said storage means; said sequencing means being simultaneously operated in response to said enable maintenance digit output signal to inhibit producing certain of said plurality of time slot signals for said current time slot for preventing DTMF receiver data from being transmitted to said storage means.

* * * * *